US012012070B2

United States Patent
Alford et al.

(10) Patent No.: US 12,012,070 B2
(45) Date of Patent: Jun. 18, 2024

(54) CONSIGNMENT DELIVERY METHODS AND SYSTEMS

(71) Applicant: Ford Global Technologies, LLC, Dearborn, MI (US)

(72) Inventors: James Ralph Alford, Wixams (GB); Ahmad Jasim, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/949,999

(22) Filed: Sep. 21, 2022

(65) Prior Publication Data

US 2024/0092313 A1    Mar. 21, 2024

(51) Int. Cl.
| | |
|---|---|
| *B60R 25/24* | (2013.01) |
| *G07C 9/00* | (2020.01) |
| *G07C 9/22* | (2020.01) |
| *H04L 9/32* | (2006.01) |
| *H04W 4/02* | (2018.01) |
| *H04W 4/024* | (2018.01) |

(52) U.S. Cl.
CPC .......... *B60R 25/24* (2013.01); *G07C 9/00309* (2013.01); *G07C 9/22* (2020.01); *H04L 9/3213* (2013.01); *H04W 4/023* (2013.01); *H04W 4/024* (2018.02); *G07C 2009/00769* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 9,652,917 B2 | 5/2017 | Johnson et al. | |
| 10,521,736 B2 | 12/2019 | Grimm et al. | |
| 10,534,819 B2 * | 1/2020 | Ricci | G01S 19/42 |
| 10,901,418 B2 | 1/2021 | Brady et al. | |
| 11,173,875 B2 | 11/2021 | Endo et al. | |
| 11,718,270 B2 * | 8/2023 | Zaharia | B60R 1/00 |
| | | | 348/148 |
| 11,738,713 B2 * | 8/2023 | Salter | B60R 25/31 |
| | | | 701/2 |
| 2016/0353239 A1 | 12/2016 | Kjellsson et al. | |
| 2017/0178035 A1 | 6/2017 | Grimm et al. | |
| 2017/0282859 A1 | 10/2017 | Grimm et al. | |
| 2018/0130159 A1 * | 5/2018 | High | G06Q 10/083 |
| 2018/0246526 A1 * | 8/2018 | Wilkinson | G08B 21/182 |
| 2020/0086829 A1 * | 3/2020 | Wall | B60R 25/24 |

(Continued)

*Primary Examiner* — Carlos Garcia
(74) *Attorney, Agent, or Firm* — Haley Guiliano LLP

(57) ABSTRACT

A consignment delivery method and a consignment delivery system comprising control circuitry is described. Control circuitry determines whether a user device is within a first threshold distance of a vehicle. A vehicle location is transmitted to the user device in response to determining that the user device is within the first threshold distance of the vehicle. Control circuitry determines whether the user device within a second threshold distance of the vehicle, wherein the second threshold distance is less than the first threshold distance. Control circuitry requests a user authentication from the user device in response to determining that the user device is within the second threshold distance of the vehicle. Control circuitry provides access to a compartment of the vehicle in response to receiving the user authentication.

17 Claims, 10 Drawing Sheets

(56) References Cited

U.S. PATENT DOCUMENTS

| | | | |
|---|---|---|---|
| 2020/0160633 A1* | 5/2020 | Zhang | B60R 25/102 |
| 2020/0223395 A1* | 7/2020 | Zhang | B60R 25/01 |
| 2021/0129797 A1* | 5/2021 | Zaharia | G06T 7/136 |
| 2021/0229627 A1* | 7/2021 | Salter | B60R 25/24 |
| 2021/0256472 A1 | 8/2021 | Javidan et al. | |

* cited by examiner

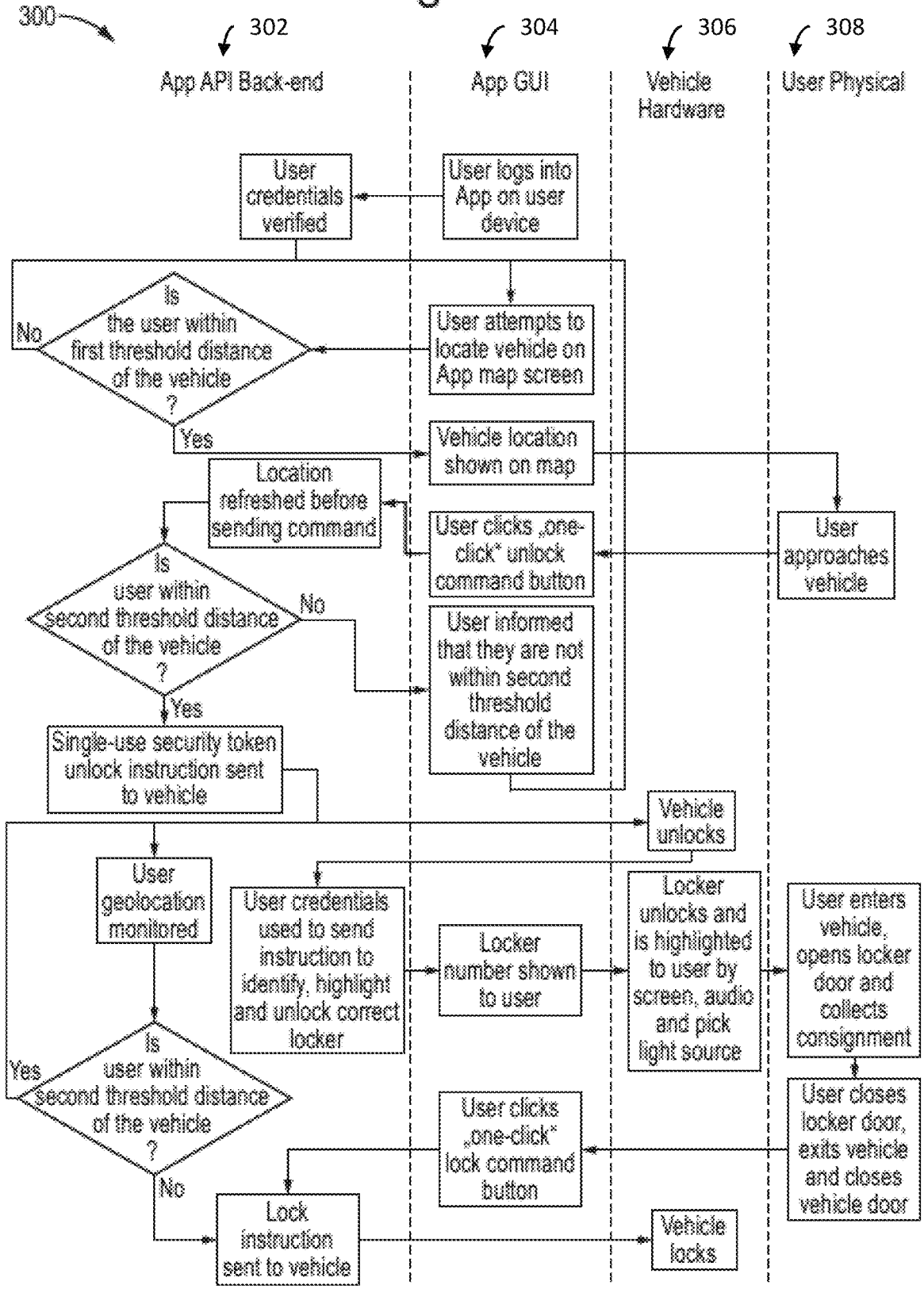

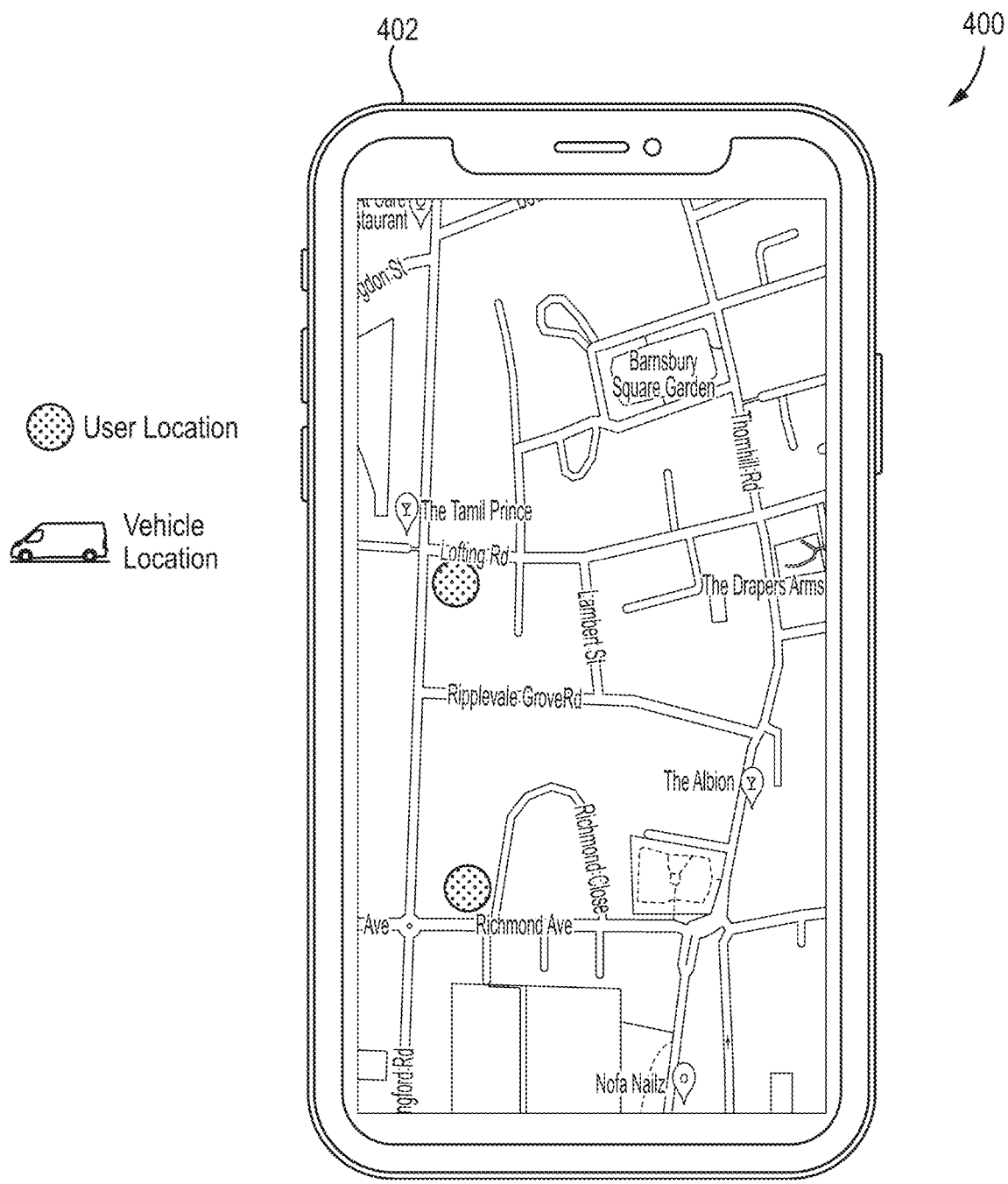

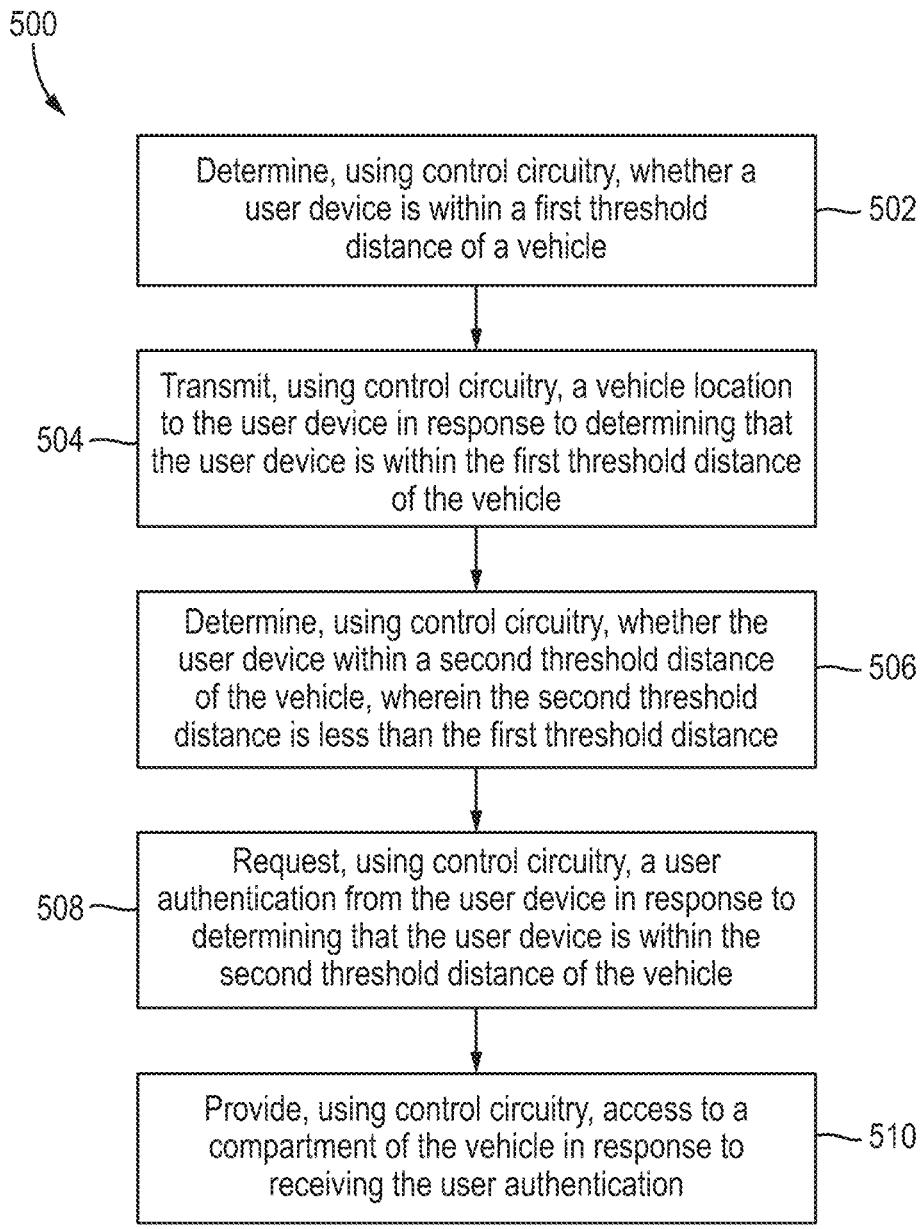

CONSIGNMENT DELIVERY METHODS AND SYSTEMS

BACKGROUND

The present disclosure relates to consignment delivery methods and systems using control circuitry operable to provide a user with access to a compartment of a vehicle in response to receiving a user authentication. Particularly, but not exclusively, the present disclosure relates to providing access to the compartment of the vehicle when a user is close to the vehicle.

SUMMARY

Within the moving goods sector, a remote vehicle unlock and lock system is needed to operate harmoniously with a robust and tamperproof way for users to collect a consignment from an autonomous vehicle. Without driver interaction, new problems exist specifically within last mile delivery whereby the user must have access to the vehicle load space and be able to identify and collect their designated consignment in a secure and time efficient way. Without a driver, human interaction is removed therefore the user needs a fast and simple method of locating the vehicle when it is stationary and an ability to interact with it intuitively and independently. With several users accessing the vehicle load space daily, there is an inherent chance that a consignment is not collected by the designated user due to user error or theft. Whilst the vehicle is stationary and not in use, it could also be susceptible to foul play by opportunists.

Accordingly, there is a need in the industry to allow the user to locate an autonomous vehicle when the vehicle is stationary, to provide the user with remote access to a load space within the vehicle, and to identify and produce the correct assignment to the user quickly and securely. There is also a need in the industry to provide an automatic locking mechanism on the vehicle which is linked to the user's location and their stage of accessing their designated consignment. Furthermore, there is a need to ensure only the designated consignment is accessible to the user.

The invention is a consignment delivery method and system which provides a user device (for example, by an Application Programming Interface (API) and a Graphical User Interface (GUI) on the user device) with information that works to allow, with a "one-click" instruction, a user to securely locate the vehicle (for example, using a Global Positioning System (GPS) or similar location means). Furthermore, the "one-click" instruction allows the user to remotely unlock the vehicle and simultaneously allow the user to identify and access only their designated consignment.

According to examples in accordance with an aspect of the disclosure, a consignment delivery method is provided. The consignment delivery method comprises determining, using control circuitry, whether a user device is within a first threshold distance of a vehicle. The consignment delivery method comprises transmitting, using control circuitry, a vehicle location to the user device in response to determining that the user device is within the first threshold distance of the vehicle. The consignment delivery method comprises determining, using control circuitry, whether the user device within a second threshold distance of the vehicle, wherein the second threshold distance is less than the first threshold distance. The consignment delivery method comprises requesting, using control circuitry, a user authentication from the user device in response to determining that the user device is within the second threshold distance of the vehicle. The consignment delivery method also comprises providing, using control circuitry, access to a compartment of the vehicle in response to receiving the user authentication.

In some examples, the vehicle location is transmitted to a user by the user device when the user is within a first threshold distance of the vehicle and/or when the user authentication is accepted.

In some examples, the consignment delivery method further comprises determining a user device location and providing navigation instructions from the user device location to the vehicle location.

In some examples, the consignment delivery method further comprises providing access to the vehicle in response to receiving the user authentication and subsequently providing the access to the compartment of the vehicle.

In some examples, the vehicle comprises a first physical barrier, and the compartment comprises a second physical barrier.

In some examples, the consignment delivery method further comprises determining whether the user device has moved outside of the second threshold distance and sending a lock command to lock the compartment of the vehicle in response to determining that the user device has moved outside of the second threshold distance.

In some examples, the user authentication is a single-use security token.

In some examples, a user authentication is requested in response to determining that the user device is within the first threshold distance of the vehicle.

According to examples in accordance with an aspect of the disclosure, a consignment delivery system is provided. The consignment delivery system comprises control circuitry which is operable to determine whether a user device is within a first threshold distance of a vehicle. The control circuitry of the consignment delivery system is operable to transmit a vehicle location to the user device in response to determining that the user device is within the first threshold distance of the vehicle. The control circuitry of the consignment delivery system is operable to determine whether the user device within a second threshold distance of the vehicle, wherein the second threshold distance is less than the first threshold distance. The control circuitry of the consignment delivery system is operable to request a user authentication from the user device in response to determining that the user device is within the second threshold distance of the vehicle. The control circuitry of the consignment delivery system is also operable to provide access to a compartment of the vehicle in response to receiving the user authentication.

In some examples, the vehicle location is transmitted to a user by the user device when the user is within a first threshold distance of the vehicle and/or when the user authentication is accepted.

In some examples, the control circuitry is further operable to determine a user device location and to provide navigation instructions from the user device location to the vehicle location.

In some examples, the control circuitry is further operable to provide access to the vehicle in response to receiving the user authentication and subsequently to provide the access to the compartment of the vehicle.

In some examples, the vehicle comprises a first physical barrier and the compartment comprises a second physical barrier.

In some examples, the control circuitry is further operable to determine whether the user device has moved outside of the second threshold distance and to send a lock command to lock the compartment of the vehicle in response to determining that the user device has moved outside of the second threshold distance.

In some examples, the user authentication is a single-use security token.

In some examples, the control circuitry is operable to request a user authentication in response to determining that the user device is within the first threshold distance of the vehicle.

According to examples in accordance with another aspect of the disclosure, a vehicle is provided. The vehicle is in operational communication with control circuitry. The control circuitry is operable to determine whether a user device is within a first threshold distance of a vehicle. The control circuitry is operable to transmit a vehicle location to the user device in response to determining that the user device is within the first threshold distance of the vehicle. The control circuitry is operable to determine whether the user device within a second threshold distance of the vehicle, wherein the second threshold distance is less than the first threshold distance. The control circuitry is operable to request a user authentication from the user device in response to determining that the user device is within the second threshold distance of the vehicle. The control circuitry is also operable to provide access to a compartment of the vehicle in response to receiving the user authentication.

In the context of the present disclosure, a vehicle or an electric vehicle may be any appropriate type of vehicle, such as an automobile, a motorbike, a marine vessel, or an aircraft. In some examples, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. In some examples, the systems and methods described herein may be used on or with any machinery or equipment, for example, a generator, requiring operational control by a user/operator.

Moreover, in the context of the present disclosure, the term "driver" or "user" may mean any person who operates a vehicle or any machinery or equipment.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are intended as mutually exclusive.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flow chart illustrating a consignment delivery method, in accordance with some examples of the disclosure;

FIGS. 4A to 4E illustrate vehicle location and user location on a graphical user interface (GUI) of a user device, in accordance with some examples of the disclosure;

FIG. 5 is a flow chart illustrating a consignment delivery method, in accordance with some examples of the disclosure.

DETAILED DESCRIPTION

Figure 1A:
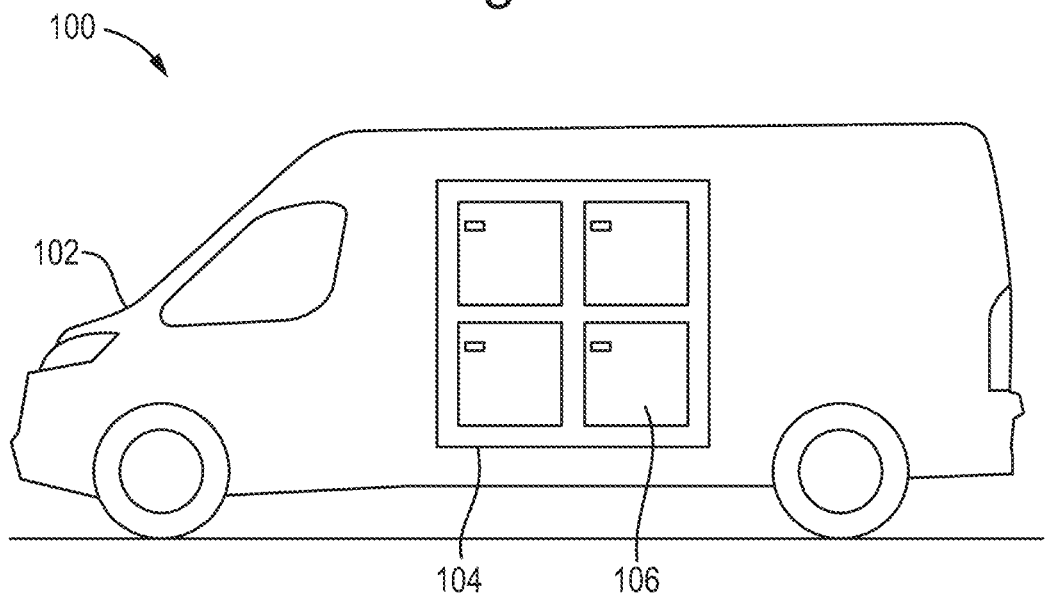
FIGS. 1A and 1B illustrate a delivery vehicle comprising a compartment, in accordance with some examples of the disclosure.
Figure 1B:
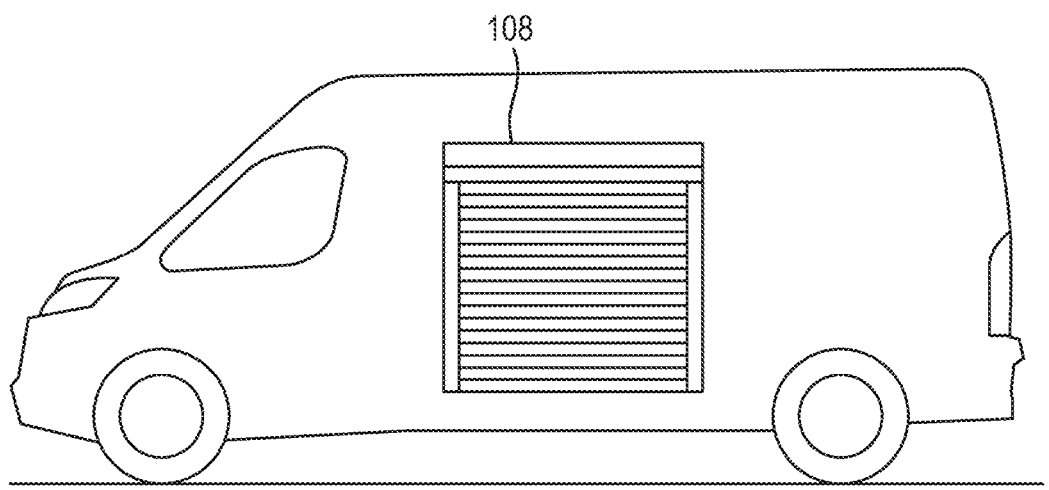

FIGS. 1A and 1B illustrate a delivery vehicle 100, 102 comprising at least one compartment to store consignments for a consignment delivery schedule. In some examples, delivery vehicle 100, 102 may be an autonomous vehicle. Delivery vehicle 100, 102 is depicted in FIGS. 1A and 1B as a two-axle and four-wheeled vehicle. However, the present invention is not limited to such vehicles and can include any other suitable type of vehicle. For example, the delivery vehicle 100, 102 can be any one of a two-wheeled vehicle, three-wheeled vehicle and more than four-wheeled vehicle such as bicycles, tricycles, mopeds, scooters motorcycles, vans, lorries, automated vehicles, etc. Moreover, the delivery vehicle can be any type of aircraft or drone. The present invention is not limited to vehicles and can also be carried out on a vessel (for example, a container that is placed on a lorry, a ship, an aircraft, or any other suitable moving vehicle) comprising at least one compartment to store consignments for a consignment delivery schedule.

In FIG. 1A the at least one compartment 106 to store consignments for a consignment delivery schedule may be accessed by a first physical barrier 104 which allows access to the vehicle storage bay (not shown). The first physical barrier 104 may be a hinged door, a set of hinged doors, an automated barrier, an armored barrier, or any other suitable type of barrier that prevents unwanted access to the vehicle storage bay. FIG. 1B depicts an alternate type of first physical barrier 108 in which the first physical barrier 108 can be of a shutter-type door which can be operated electrically or manually. The first physical barrier 104, 108 depicted in FIGS. 1A and 1B can be placed on any side of the delivery vehicle 100, 102 to ensure suitable access to the storage bay.

The vehicle storage bay may be a single storage compartment (for example, a locker) suitable for storing a plurality of consignments for a consignment delivery schedule. Alternatively or additionally, the vehicle may have a storage bay fragmented into a plurality of storage compartments 106 allowing for consignments to be separated by size, weight, product type, recipient address, or any other metric. In some examples, the plurality of storage compartments 106 each comprise a physical barrier. The physical barrier of each of the storage compartments 106 can operate as a second physical barrier behind the first physical barrier 104, thereby providing an additional level of protection from unwanted access for consignments. In other examples, physical barrier of each of the storage compartments 106 may be directly viewable and/or accessible from the outside of the vehicle (for example, by not utilizing the first physical barrier 104, 108 on the vehicle 100, 102), thereby allowing for better access to a specific consignment (or set of consignments) in the delivery vehicle 100, 102. For example, if the delivery vehicle 100, 102 is delivering plumbing consignments, one of the storage compartments 106 may comprise washers, a different storage compartment 106 may comprise pipes, a further storage compartment 106 may comprise pumps, and so forth. In another example, if the delivery vehicle 100, 102 is delivering consignments for designated recipients, one storage compartment 106 may comprise a consignment (or set of consignments) for a first recipient, a different storage compartment 106 may comprise a different consignment (or set of consignments) for a second recipient, and so forth. Naturally, the type of consignment(s) is not limited to plumbing or any other specific industry.

The first physical barrier 104, 108 may comprise at least one locking mechanism to prevent unwanted access to the vehicle storage bay and the at least one storage compartment. In some examples, the physical barrier of the plurality of storage compartments 106 as depicted in FIG. 1A may each comprise at least one locking mechanism to prevent unwanted access to the storage compartments 106. Each of the locking mechanisms may be operated manually, remotely, and/or electrically as will be described in more detail below.

Figure 2:
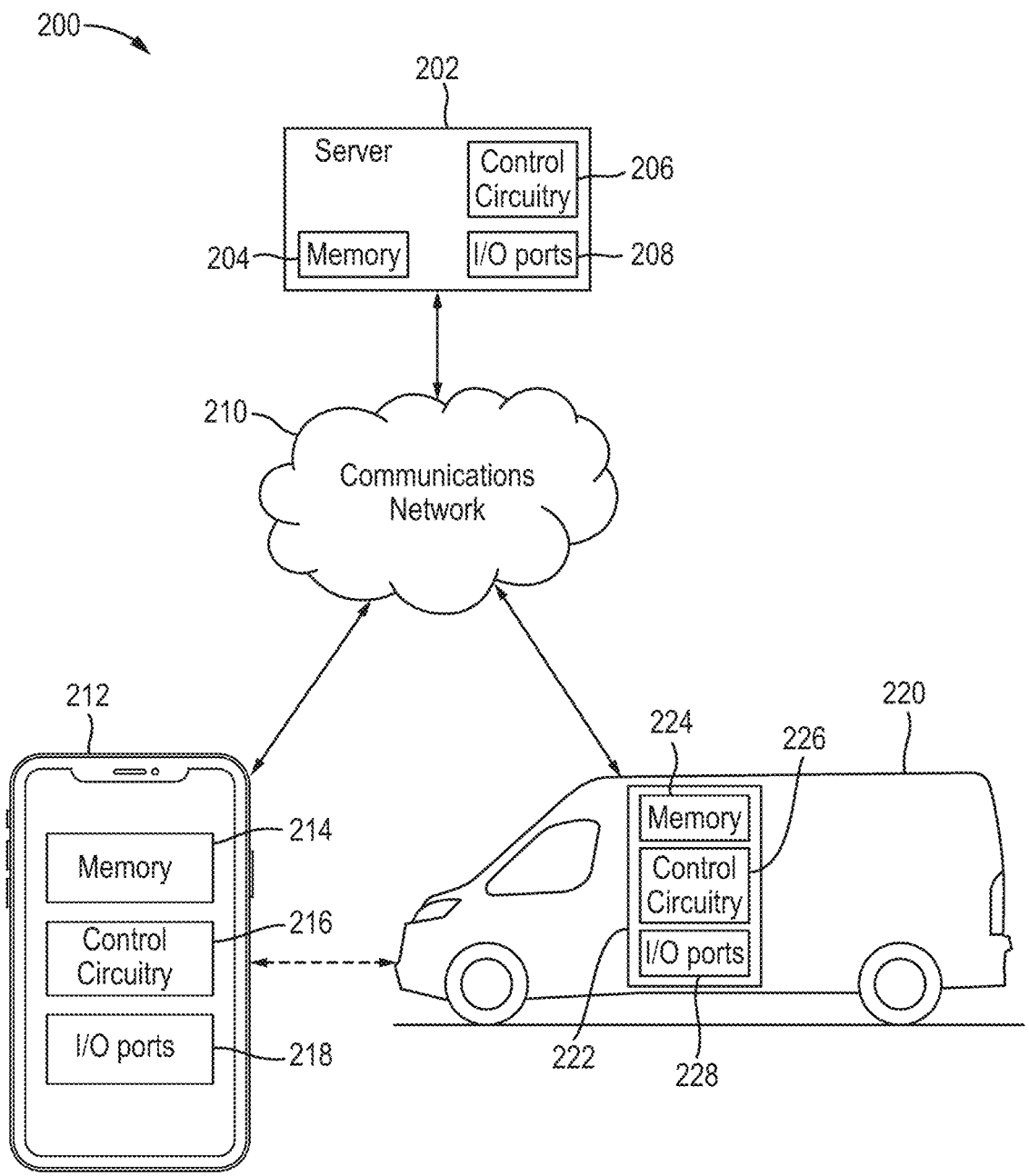
FIG. 2 illustrates a communications system of a vehicle, a user device and a server, in communication with a communications network, in accordance with some examples of the disclosure.

FIG. 2 illustrates a communications system 200 comprising a server 202, a user device 212, a delivery vehicle 220 comprising processing means 222, and a communications network 210. The delivery vehicle 220 is substantially the same as the delivery vehicle 100, 102 as described above with reference to FIG. 1. The server 202, the user device 212 and the processing means 222 of the delivery vehicle 220 each comprise a memory and a control circuitry to allow each of the server 202, the user device 212 and the processing means 222 of the delivery vehicle 220 to store and carry out computer-readable instructions. For example, server 202 comprises memory 204 and control circuitry 206, user device 212 comprises memory 214 and control circuitry 216, and processing means 222 of the delivery vehicle 220 comprises memory 224 and control circuitry 226. Furthermore, each of the server 202, the user device 212, and the processing means 222 of the delivery vehicle 220 comprise input/output (I/O) ports 208, 218, and 228 respectively. Each of the I/O ports 208, 218, 228 may comprise a wireless transceiver (not shown) which may communicate (for example, using WiFi, Bluetooth, or any other suitable wireless connection) with any of the other I/O ports 208, 218, 228 directly or through communications network 210. Accordingly, each of the server 202, the user device 212, and the processing means 222 of the delivery vehicle 220 can send and receive data and/or instructions to each other directly and/or through the communications network 210. In some examples, the user device 212 can communicate directly with the processing means 222 of the delivery vehicle 220 without going through the communications network 210. FIG. 2 depicts a single server 202, a single user device 212, and a single delivery vehicle 220. The present invention may include any number of servers, user devices and delivery vehicles in directly in communication with each other or in communication with each other through the communications network 210.

The data, instructions and/or communications sent and received between the server 202, the user device 212, and/or the processing means 222 of the delivery vehicle 220 may be used to provide a user with a consignment from the delivery vehicle 220, for example, by providing access to at least one of the compartments of the delivery vehicle 220 in response to receiving a user authentication from the user device. This concept is described in more detail below with reference to FIGS. 3 to 6.

FIG. 3 is a flowchart illustrating processes 300 and steps for consignment delivery arrangements and methods which allow a user to locate an autonomous vehicle (for example, vehicle 102 and/or vehicle 220 as described above with reference to FIGS. 1 and 2) and provide the user with remote access to a load space within the vehicle (for example, the vehicle storage bay as described above with reference to FIG. 1 and/or the plurality of storage compartments 106 as described above with reference to FIG. 1), and to identify and produce the correct assignment to the user quickly and securely. In FIG. 3 some processes 302, 304 may take place on an application program or application software which may, for example, run on a user device 400 as shown in FIGS. 4A to 4E. The user device 400 is substantially the same as user device 212 described above with reference to FIG. 2. Processes 300 may comprise some processes 302 which take place on an application API back-end (such as, for example, by processing, transmitting, and/or receiving instructions at any one or a plurality of memory 214, control circuitry 216 and/or I/O ports 218 as described above with reference to FIG. 2). Processes 300 may comprise some processes 304 which are performed by the application program or application software on the application graphical user interface (GUI). For example, in response to some of the processes 302, 304, 308, a plurality of messages and/or indications may be displayed on the application (GUI) 402 such as, for example, the display 402 of the user device 400. Processes 300 may further comprise some processes 306 that may take place on the vehicle 102, 220 hardware (for example, processing means 222, memory 224, control circuitry 226, and/or I/O ports 228 as described above with reference to FIG. 2). Furthermore, processes 300 may further comprise some processes 308 which may be physical inputs prompted by the user.

As shown in FIG. 3, a user may log into an application program or application software on user device 212, 400 when attempting to collect a consignment from a delivery vehicle (such as delivery vehicle 220). The log-in process may comprise the user providing authentication which can comprise user credentials and/or a password or passcode to the application program on the user device via the application GUI 402. The user credentials and/or the passcode may be in the form of alphanumeric input provided to the user device 212, 400 on the application GUI 402. In other examples, the user credentials and/or passcode may be any other form of user input to identify the user such as, but not limited to, fingerprint identification, voice identification, face/photo identification, retina identification, and/or any other suitable input to identify the user. After receiving the user credentials, the application API back-end may verify the user credentials. This can comprise, for example, determining that the input matches the user credentials associated with a user account. If the input matches the user credentials, the user may be logged on to the application program.

Subsequent to verifying the user credentials, the application API back-end may determine a user location (for example, using a Global Positioning System (GPS) or similar location means) and display the user location on a map on the application GUI 402. This is demonstrated in FIG. 4A wherein the user location is presented to the user on the application GUI 402 in the form of a marker. The user may then attempt to locate the vehicle 220 location on the map of the application GUI 402.

In some examples, the delivery vehicle 220 location can be separately determined (for example, using a Global Positioning System (GPS) or similar location means) by the processing means 222 and/or any tracking hardware/software installed to the delivery vehicle 220. The delivery vehicle location may be transmitted to user device 212, 400 at frequent intervals. In some examples, the delivery vehicle location is transmitted to the user device 212, 400 via communications network 210 (for example, using WiFi, or any other suitable wireless long-distance communication system). In other examples, the delivery vehicle location may be transmitted directly to the user device 212, 400 (for example using Bluetooth, or any other suitable wireless short-distance communication system). In some examples, a notification may be sent to the user device 212, 402 (for example, through communications network 210) at a predetermined time in advance of a scheduled delivery. For example, the user device 212, 402 may provide the user with a notification that the delivery vehicle 220 is close to prompt the user log into the application program.

Each time the delivery vehicle location is transmitted from the delivery vehicle 220 to the user device 212, 400, the application API back-end of the user device 212, 400 determines, using control circuitry 216 and/or control circuitry 206, the distance (for example, straight line distance) between the user device 212, 400 and the delivery vehicle 220. As the delivery vehicle 220 approaches the user device 212, 400, the frequency of location transmissions may increase (i.e., more location transmissions are sent by the delivery vehicle 220 to the user device 212, 400). If the user device 212, 400 is determined to be within a first threshold distance of the delivery vehicle 220, the precise location of the delivery vehicle 220 may be displayed on the map of the application GUI 402 as shown, for example, in FIG. 4B. This allows the user to locate and approach the delivery vehicle 220 to collect the consignment(s) as shown, for example, in FIG. 4C. If the user device 212, 400 is determined not be within the first threshold distance of the delivery vehicle 220, the user is informed (for example via the application GUI) that they are not within either of the first threshold distance of the vehicle and/or a second threshold distance of the vehicle (as described below). The user may attempt to locate the delivery vehicle 220 on the application map screen 402 until the user device 212, 400 is within the first threshold distance of the delivery vehicle 220.

Figure 4A:
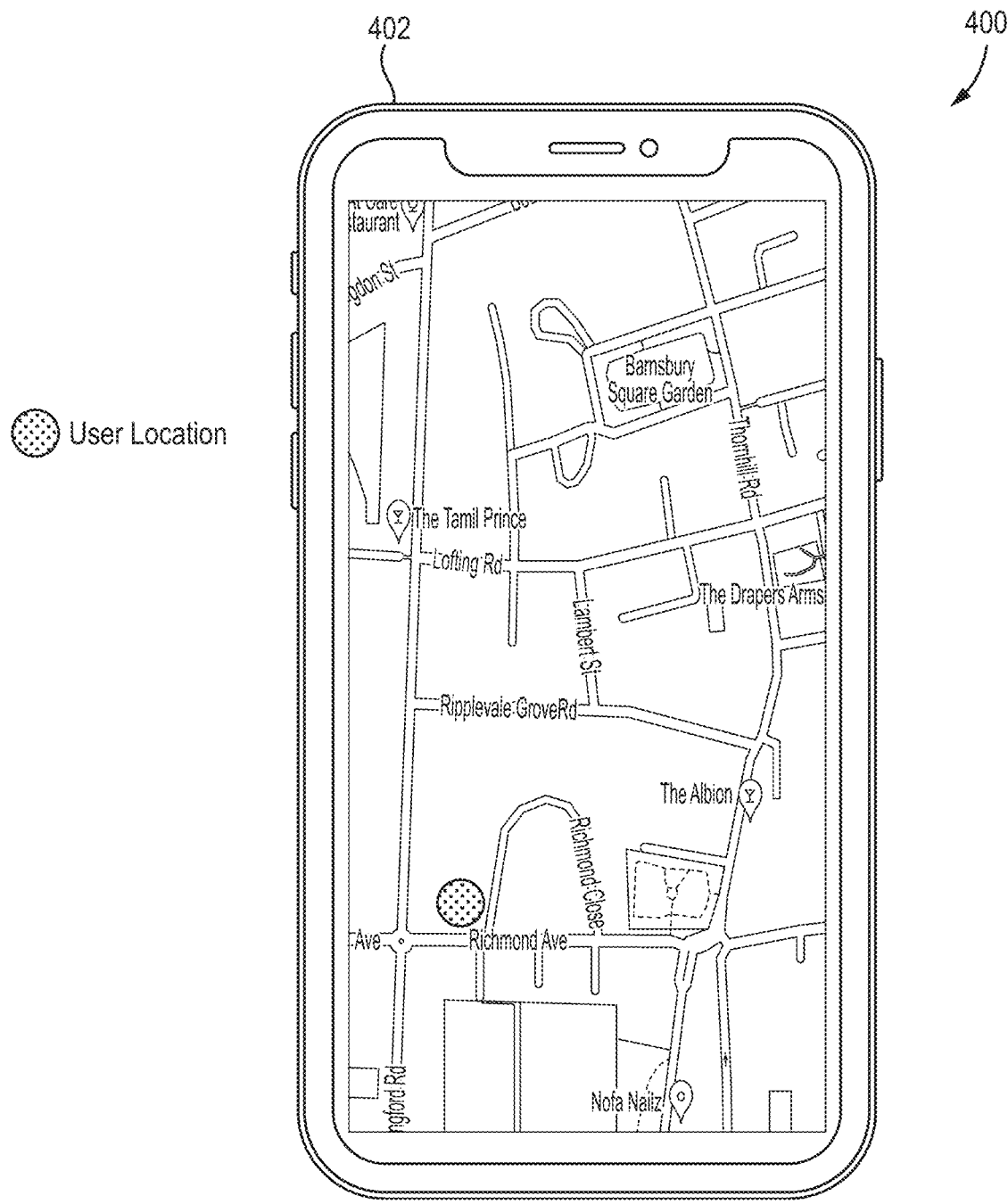
Figure 4B:
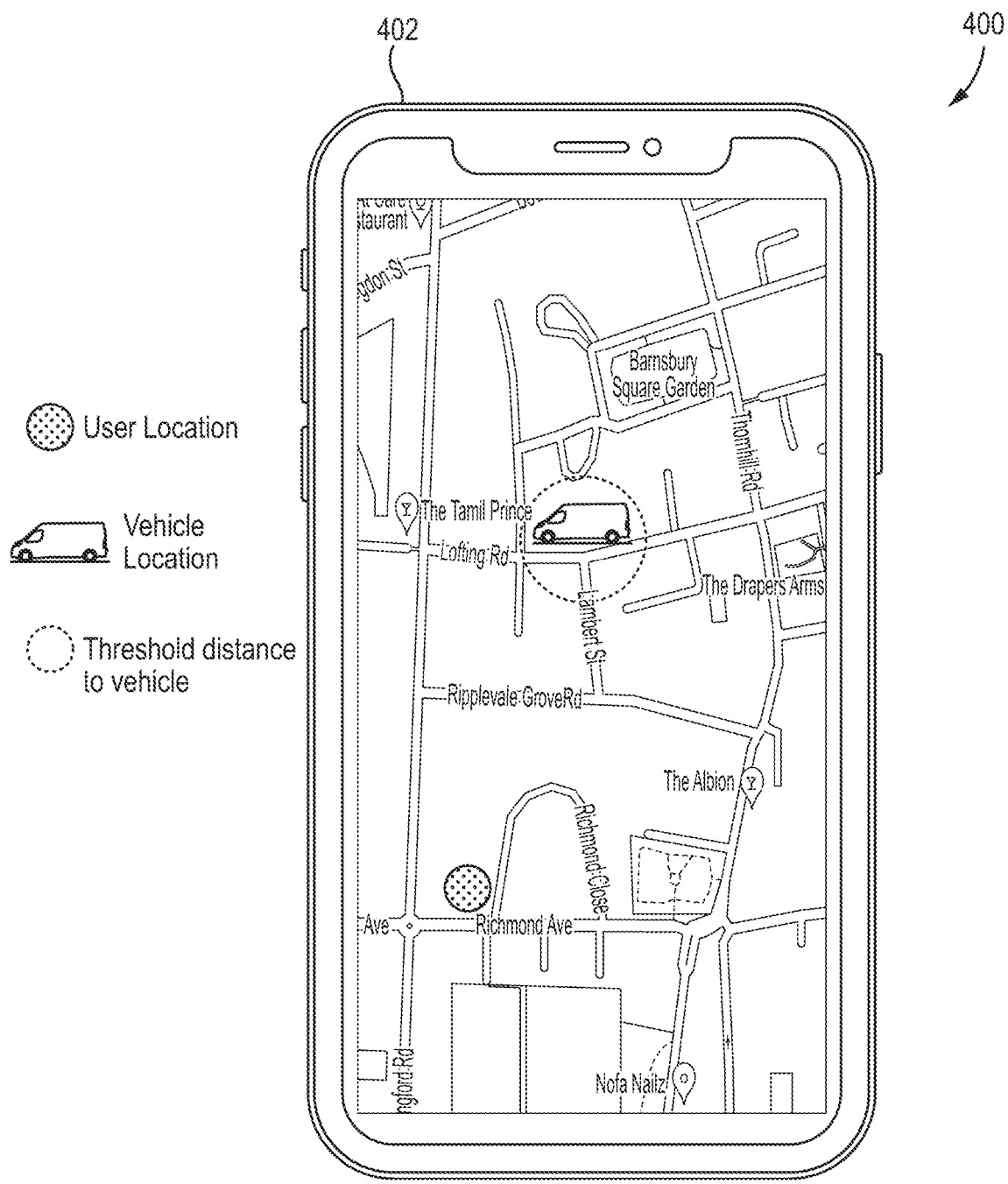
Figure 4C:
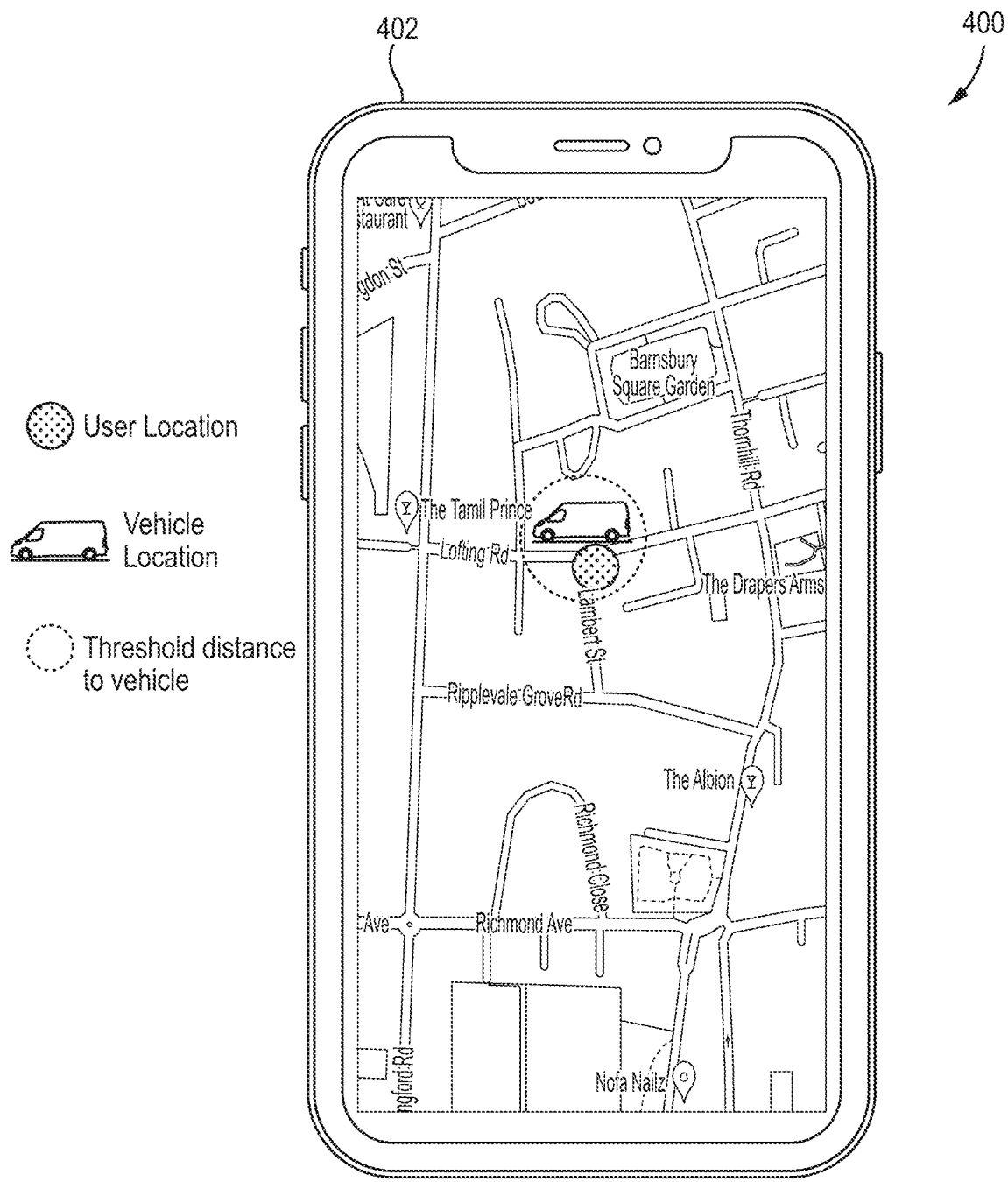

As the user approaches the delivery vehicle 220, as shown in FIG. 4C, the delivery vehicle location may still be continuously transmitted to user device 212, 400. In some examples, the method of transmitting the delivery vehicle location may change once the user device 212 has determined that it is within the first threshold distance of the delivery vehicle 220. For example, if the delivery vehicle location was transmitted to the user device 212 via communications network 210 when the user device was not within the first threshold distance, then the delivery vehicle location may be transmitted directly to the user device 212 (for example, using Bluetooth, or any other suitable wireless short-distance communication system).

The user device 212 may continuously determine the distance (for example, straight line distance) between the user device 212, 400 and the delivery vehicle 220. If the user device 212, 400 is determined to be within a second threshold distance of the delivery vehicle 220, wherein the second threshold distance is less than the first threshold distance, the user device 212, 400 may send (for example, via I/O ports 218 and, optionally, through communications network 210) an unlock command to the delivery vehicle 220. The delivery vehicle 220 can receive the unlock command (for example, from communications network 210 or directly from I/O ports 228) and, subsequently, unlock the vehicle storage bay (as described above with reference to FIG. 1). In some examples, unlocking the vehicle storage bay may comprise unlocking the first physical barrier 104, 108 as described above with reference to FIG. 1.

In some examples, the user can click an "unlock" button on the application GUI to send the unlock command to the delivery vehicle. This may occur once the user device 212, 400 is determined to be within the second threshold distance of the delivery vehicle 220, or before the user device 212, 400 is determined to be within the second threshold distance of the delivery vehicle 220. The unlock command may comprise a further user authentication (for example, a single-use security token) which is linked to the user device 212, 400 and the delivery vehicle 220. If the further user authentication sent by the user device 212, 400 matches the user authentication of the delivery vehicle and if the user device 212, 400 is within the second threshold distance of the delivery vehicle 220, the user device 212, 400 may send (for example, via I/O ports 218 and, optionally, through communications network 210) an unlock command to the delivery vehicle 220. The delivery vehicle 220 can receive the unlock command (for example, from communications network 210 or directly from I/O ports 228) and, subsequently, unlock the vehicle storage bay (as described above with reference to FIG. 1). In some examples, unlocking the vehicle storage bay may comprise unlocking the first physical barrier 104, 108 as described above with reference to FIG. 1.

In some examples user credentials are verified during login and the vehicle is shown on a map in the GUI based on the geo location of the user device 212, 400 and that of the delivery vehicle 220, a proximity block can be used to prevent vehicle stalking meaning that the user can only locate the delivery vehicle 220 when the user device 212, 400 is within the first threshold distance (for example, but not limited to, 300 meters) of the stationary delivery vehicle 220. If the user cannot locate the delivery vehicle 220 on the application GUI 402 a refresh command button feature can be presented on the application GUI 402 which can update the geo location and determine if it the user device 212, 400 is now within the first threshold distance of the stationary delivery vehicle 220.

If the user device 212, 400 is no longer within the second threshold distance of the delivery vehicle 220, the unlock command is not transmitted and the user device 212, 400 may inform the user (for example, by displaying a notification on the application GUI) that the user is not within the second threshold distance of the delivery vehicle 220). In this case, the application API back end may determine once more, whether the user device 212, 400 is within the first threshold distance and/or within the second threshold distance of the delivery vehicle 220 as described above.

In some examples, the further user authentication (for example, single-use security token) may be time sensitive such that, once a predetermined amount of time has lapsed after the user device 212, 400 is determined to be within the second threshold distance of the delivery vehicle 220, the unlock command will no longer unlock the delivery vehicle 220.

The user device's location as well as the delivery vehicle's location may be continuously monitored while the first physical barrier 104, 108 of the delivery vehicle 220 is unlocked. If the distance between the user device 212, 400 is no longer within the second threshold distance of the delivery vehicle 220, the delivery vehicle 220 may automatically lock the first physical barrier 104, 108 and, optionally, inform the user (on the application GUI) that vehicle storage bay has been locked. In some examples, automatically locking the first physical barrier 104, 108 may comprise generating, by control circuitry 216 of the user device 212, 400, a "lock" command and sending, by I/O ports 218 of the user device 212, 400, the "lock" command to the processing means 222 of the delivery vehicle 220 (either directly to the I/O ports 228 of the delivery vehicle 220, or via communications network 210). The processing means 222 of the delivery vehicle 220 may, subsequently, cause the first physical barrier 104, 108 of the delivery vehicle 220 to be locked (which may comprise closing the first physical barrier 104, 108 before it is locked).

When the vehicle storage bay (for example, the first physical barrier 104, 108) is unlocked the application API back end processes the user's credentials to send an instruction to the processing means 222 of the delivery vehicle 220 to identify a consignment or a plurality of consignments designated to the user. In some examples, this may include, at the delivery vehicle, highlighting the consignment or plurality of consignments with the use of a video and/or audio communication system and/or with the use of a pick light source in the vehicle storage bay.

In some examples, identifying a consignment or a plurality of consignments designated to the user may further comprise subsequently providing access to a dedicated compartment (such as, for example, storage compartments 106 and/or lockers as described above with reference to FIG. 1) of the delivery vehicle 220. Each of the plurality of storage compartments 106 may comprise a second physical barrier (not shown) and a lock which protect the consignments within the storage compartments 106. Each of the plurality of storage compartments 106 may be numbered differently. The storage (or locker) compartment number comprising the designated consignment(s) for the user may be identified to the user by displaying the designated storage compartment number on the application GUI. In some examples, a further unlock command may be sent to the designated storage compartment 106 to unlock and open the second barrier of the storage compartment 106 comprising the designated consignment(s) for the user. The further unlock command may be processed by control circuitry 216 and sent by I/O ports 218 of the user device 212 to processing means 222 of the delivery vehicle 220. Processing means 222 of the delivery vehicle can relay the further unlock command to the designated storage compartment 106 to unlock the designated storage compartment 106 and present the designated consignment(s) to the user. This may comprise highlight the consignment(s) with the use of a video and/or audio communication system and/or with the use of a pick light source in the vehicle storage bay. In other examples, the unlock command may be processed directly by the vehicle or the designated storage compartment 106.

Sensors (for example, light sensors, weight sensors, bar code readers, etc.) in the designated storage compartment 106 can sense when the designated consignment(s) have been removed from the designated storage compartment 106 and can, subsequently, send a notification to the user device 212 to close the second physical barrier of the designated storage compartment 106, to exit the delivery vehicle 220 (if the storage compartments 106 are within the vehicle storage bay), and to close the first physical barrier of the delivery vehicle 220. This can be done, for example, by presenting a push notification to the user on the application GUI 402. In some examples, the second physical barrier of the designated storage compartment 106 may automatically close once the user has retrieved their designated consignment(s). In some examples, the first physical barrier 104, 108 of the delivery vehicle 220 may automatically close once the user device 212, 400 is no longer within the second threshold distance of the delivery vehicle 220.

In some examples, the storage compartments 106 may comprise a tamperproof locker system whereby the locker number is presented to the user on the application GUI 402 in addition to having a screen inside the vehicle storage bay to display the locker number alongside a pick light system and audio message, a designated storage compartment 106 may be unlocked on a timer. If the timer expires, the user can repeat the process and unlock the storage compartment 106.

As a final step, a "lock" push notification may be presented to the user on the application GUI 402 once the user has retrieved their designated consignment(s) and has closed the first physical barrier 104, 108 and/or the second physical barrier. The "lock" push notification may be a "one-click" notification which, when activated on the user device 212, 400, causes a "lock" command to be sent to the delivery vehicle 220 (as described above) to lock the first physical barrier 104, 108 and/or the second physical barrier. In other examples, the delivery vehicle 220 may comprise a physical "lock" button which, upon being depressed, causes a "lock" command to be sent to the delivery vehicle 220 (as described above) to lock the first physical barrier 104, 108 and/or the second physical barrier.

The "One-Click" API provides an intuitive GUI and works by allowing the user to locate the delivery vehicle 220 and, with one-click of the unlock command button, allowing the user to remotely unlock the first physical barrier 104, 108 of the delivery vehicle 220 and simultaneously unlock the second physical barrier of the designated storage compartment 106.

This, in turn provides a quick method of identifying and accessing only the designated consignment(s) of the user. Advantageously, the One-Click" unlock and lock API uses proximity in combination with user credentials to allow access to the load space only when the delivery vehicle 220 is stationary. The API recognizes the user credentials and only presents the designated consignment for collection at the point at which the first physical barrier 104, 108 is open. Furthermore, the above-mentioned API negates the requirement for a user to have a physical key to unlock the vehicle as the "One-Click" API is a digital key where the user can login and use the application program to obtain predetermined access to their designated consignment(s). This is valuable to organizations operating in the last mile delivery space where temporary access to the vehicle storage bay and specific consignments will need to be granted to multiple users daily. Unlocking both the first physical barrier 104, 108 and the second physical barrier (for example, the designated storage compartment 106) simultaneously leads to additional time savings in comparison to current delivery methods. Accidental collection of a non-designated consignment by the user is also mitigated with the above-mentioned arrangement as only the correct consignment(s) are presented to the user based on their unique login credentials. The correct consignment(s) are secured inside a tamperproof locker or within a carousel system ensuring that no other consignment can be accessed when the first physical barrier 104, 108 is open.

Figure 4D:
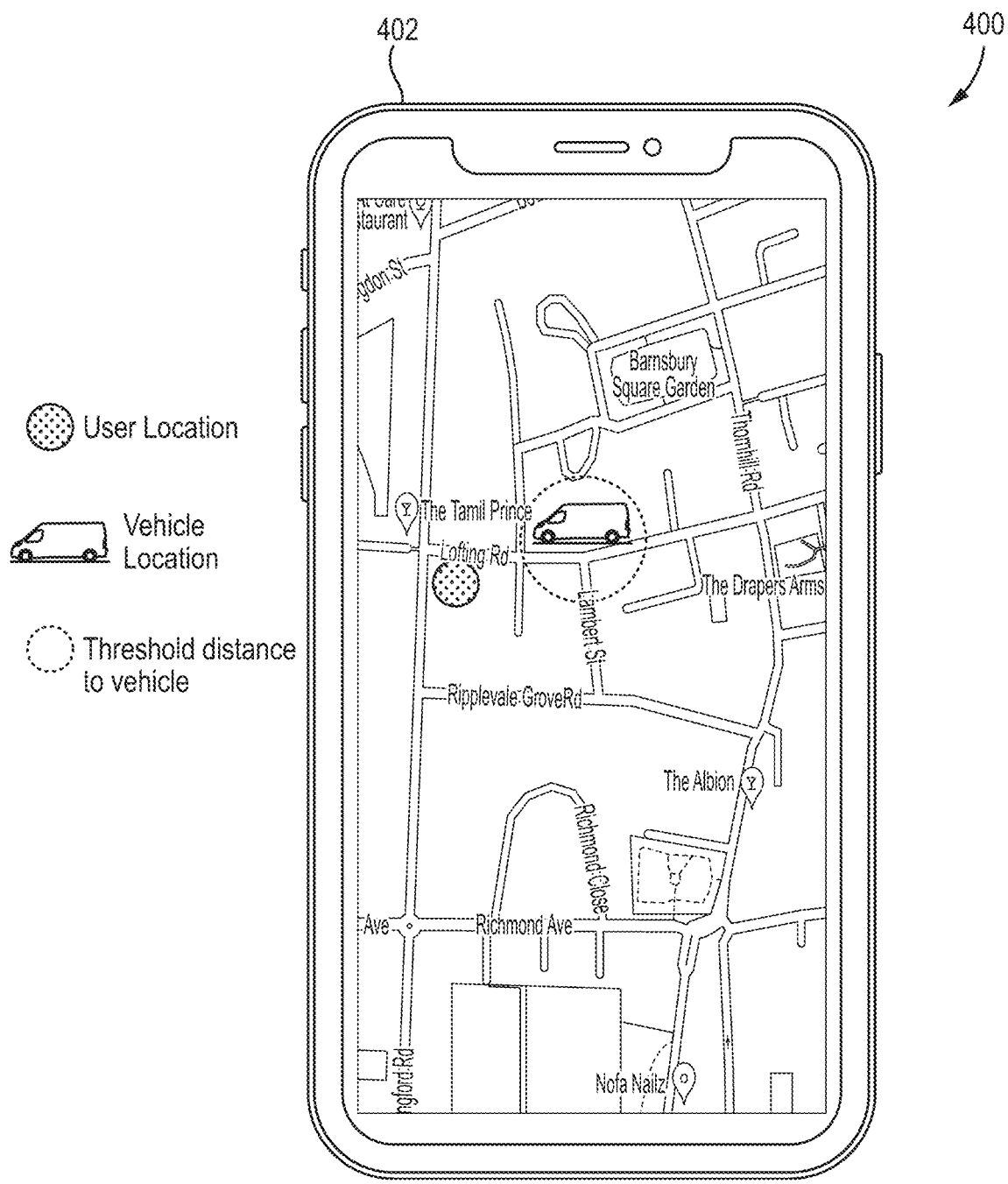

The delivery vehicle location is displayed on the application GUI 402 of the user device as shown in FIG. 4D for a predetermined period of time. This allows the user to quickly locate the delivery vehicle 220, for example, in the event that the user discovers an error with their consignment or has forgotten something inside the delivery vehicle 220. After the predetermined period of time has lapsed, tracking of the delivery vehicle 220 stops and the delivery vehicle 220 is no longer present on the application GUI 402 as shown in FIG. 4E.

FIG. 5 is a flow chart illustrating a consignment delivery method, in accordance with some examples of the disclosure, and the flow chart described in FIG. 3 above with reference to FIGS. 4A to 4E. At step 502, control circuitry (for example control circuitry 206 of the server 202, control circuitry 216 of the user device 216, and/or control circuitry 226 of the delivery vehicle 220 as described above with reference to FIG. 2) determines whether a user device (for example, user device 212, 400) is within a first threshold distance (as described above) of a vehicle (such as, for example, delivery vehicle 220 as described above with reference to FIG. 2). At step 504, a vehicle location is transmitted, using the control circuitry 206, 216, 226, to the user device 212, 400 in response to determining that the user device 212, 400 is within the first threshold distance of the vehicle 220.

At step 506, it is determined, using control circuitry 206, 216, 226, whether the user device is within a second threshold distance of the vehicle 220, wherein the second threshold distance is less than the first threshold distance. At step 508, a user authentication (as described above) is requested from the user device 212, 400, using control circuitry 206, 216, 226, in response to determining that the user device 212, 400 is within the second threshold distance of the vehicle 220. Finally, at step 510, access to a compartment of the vehicle (for example, vehicle storage bay and/or a designated storage compartment 106 as described above) is provided, using control circuitry 206, 216, 226, in response to receiving the user authentication.

Figure 6:
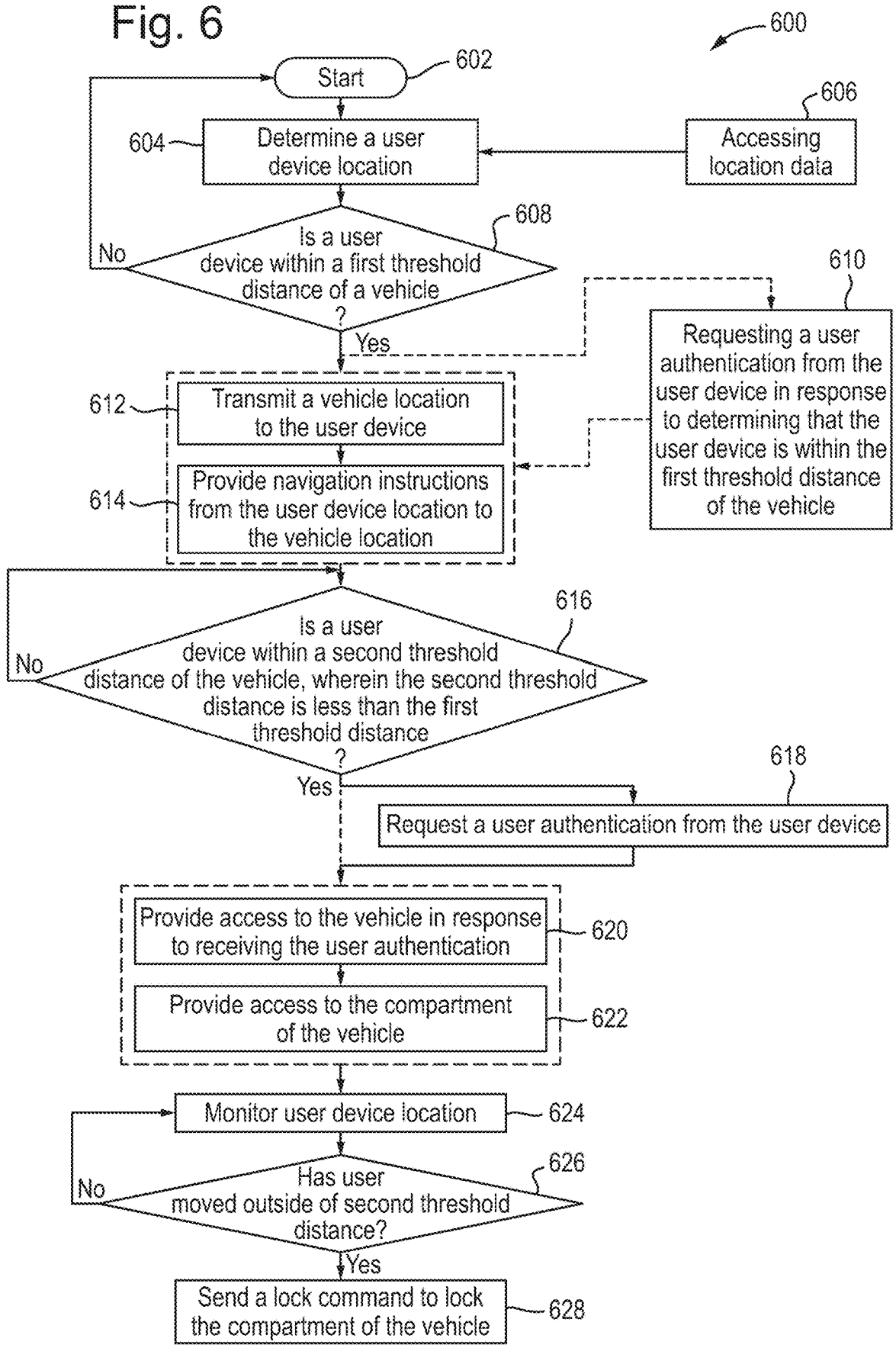
FIG. 6 is a detailed flow chart illustrating a consignment delivery method, in accordance with some examples of the disclosure.

FIG. 6 is a detailed flow chart illustrating the consignment delivery method and system described in FIGS. 3 and 5 above. At step 602, the method starts when, for example, the user logs into the application program on the user device 212, 400. At step 604, a user device location can be determined, for example, using geo location systems and/or GPS as discussed above. At step 606, location data, can be received (for example, from communications network 210 in communication with a server, such as server 202) to accurately determine the user device location.

Step 608 substantially represents step 502 as described in FIG. 5 above, wherein control circuitry 206, 216, 226 determines whether a user device 212, 400 is within a first threshold distance (as described above) of a vehicle 220. If the user device 212, 400 is within the first threshold distance of the vehicle 220, then the process may move on to optional step 610 and, subsequently, to step 612. If the user device 212, 400 is not within the first threshold distance of the vehicle 220, then the process returns to the start at step 602 wherein, for example, the user is informed on the application GUI 402 that they are not within the first threshold distance of the vehicle.

At optional step 610, a user authentication can be requested (for example, by processing means 222 of vehicle 220) in response to determining that the user device 212, 400 is within the first threshold distance of the vehicle 220. Step 612 substantially represents step 504 as described in FIG. 5 above, wherein a vehicle location is transmitted, using the control circuitry 206, 216, 226, to the user device 212, 400 in response to determining that the user device 212, 400 is within the first threshold distance of the vehicle 220. At step 614, navigations instructions can be provided at the application GUI 402, for example using the location data or any other suitable data retrieved from server 202 or any other server, to instruct the user from the user device location 212, 400 to the vehicle location 220.

At step 616, which substantially refers to step 506 of FIG. 5 as described above, it is determined, using control circuitry 206, 216, 226, whether the user device 212, 400 is within a second threshold distance of the vehicle 220, wherein the second threshold distance is less than the first threshold distance. If the user device 212, 400 is within the second threshold distance of the vehicle 220, the process moves on to step 618 or 620. If the user device 212, 400 is not within the second threshold distance of the vehicle 220, then the process at step 616 is repeated until the user device 212, 400 is within the second threshold distance of the vehicle 220.

At step 618, a user authentication (such as the further user authentication as described above with reference to FIGS. 3 and 4) is requested from the user device 212, 400 using control circuitry 206, 216, 226 in response to determining that the user device is within the second threshold distance of the vehicle. Optionally, step 618 can be skipped by providing access to the vehicle 220 with use of the initial user authentication (for example, user credentials as described above with reference to FIGS. 3 and 4) without the need to provide the further user authentication as described in step 618. In some examples, the user authentication, the further user authentication and/or the user credentials may be a single-use security token.

At step 620, access to the vehicle 220 is provided using control circuitry 206, 216, 226 in response to receiving the user credentials and/or the user authentication. At step 622 access to a compartment (for example vehicle storage bay and/or designated storage compartment 106 as described above) of the vehicle 220 may be provided subsequently to step 620. In some examples, the vehicle 220 may comprise a first physical barrier, and the compartment 106 may comprise a second physical barrier.

At step 624, the location of the user device 212, 400 is monitored. For example, as discussed in FIGS. 3 and 4 above, the location of the user device 212, 400 may be monitored when the vehicle 220 is not within the first threshold distance of the user device 212, 400 and when the vehicle 220 is within the first threshold distance of the user device 212, 400. Furthermore, the location of the user device 212, 400 may be monitored when the vehicle 220 is not within the second threshold distance of the user device 212, 400 and when the vehicle 220 is within the second threshold distance of the user device 212, 400. Step 626 determines (for example, using control circuitry 206, 216, 226) whether the user device 212, 400 has moved outside of the second threshold distance. If user device 212, 400 has moved outside of the second threshold distance, the method can move on to step 628 wherein a lock command can be sent to the vehicle 220 to lock the compartment 106 of the vehicle 220 in response to determining that the user device 212, 400 has moved outside of the second threshold distance. If user device 212, 400 has not moved outside the second threshold distance, the method may return to step 624 wherein the location of the user device 212, 400 is continuously monitored.

The below items are also included in accordance with some examples of the disclosure.

Item 1 is a consignment delivery method comprising determining, using control circuitry, whether a user device is within a first threshold distance of a vehicle, transmitting, using control circuitry, a vehicle location to the user device in response to determining that the user device is within the first threshold distance of the vehicle, determining, using control circuitry, whether the user device within a second threshold distance of the vehicle, wherein the second threshold distance is less than the first threshold distance, requesting, using control circuitry, a user authentication from the user device in response to determining that the user device is within the second threshold distance of the vehicle, and providing, using control circuitry, access to a compartment of the vehicle in response to receiving the user authentication.

Item 2 is the consignment delivery method of item 1, wherein the vehicle location is transmitted to a user by the user device when the user is within a first threshold distance of the vehicle; and/or when the user authentication is accepted.

Item 3 is the consignment delivery method of item 1, further comprising determining a user device location, and providing navigation instructions from the user device location to the vehicle location.

Item 4 is the consignment delivery method of item 1 further comprising providing access to the vehicle in response to receiving the user authentication, and subsequently providing the access to the compartment of the vehicle.

Item 5 is the consignment delivery method of item 4, wherein the vehicle comprises a first physical barrier, and wherein the compartment comprises a second physical barrier.

Item 6 is the consignment delivery method of item 1, further comprising determining whether the user device has moved outside of the second threshold distance, and sending a lock command to lock the compartment of the vehicle in response to determining that the user device has moved outside of the second threshold distance.

Item 7 is the consignment delivery method of item 1, wherein the user authentication is a single-use security token.

Item 8 is the consignment delivery method of item 1, wherein a user authentication is requested in response to determining that the user device is within the first threshold distance of the vehicle.

Item 9 is a consignment delivery system comprising control circuitry operable to determine whether a user device is within a first threshold distance of a vehicle, transmit a vehicle location to the user device in response to determining that the user device is within the first threshold distance of the vehicle, determine whether the user device within a second threshold distance of the vehicle, wherein the second threshold distance is less than the first threshold distance, request a user authentication from the user device in response to determining that the user device is within the second threshold distance of the vehicle, and provide access to a compartment of the vehicle in response to receiving the user authentication.

Item 10 is the consignment delivery system of item 9, wherein the vehicle location is transmitted to a user by the user device when the user is within a first threshold distance of the vehicle, and/or when the user authentication is accepted.

Item 11 is the consignment delivery system of item 9, wherein the control circuitry is further operable to determine a user device location, and to provide navigation instructions from the user device location to the vehicle location.

Item 12 is the consignment delivery system of item 9, wherein the control circuitry is further operable to provide access to the vehicle in response to receiving the user authentication, and subsequently to provide the access to the compartment of the vehicle.

Item 13 is the consignment delivery system of item 12, wherein the vehicle comprises a first physical barrier, and wherein the compartment comprises a second physical barrier.

Item 14 is the consignment delivery system of item 9, wherein the control circuitry is further operable to determine whether the user device has moved outside of the second threshold distance, and to send a lock command to lock the compartment of the vehicle in response to determining that the user device has moved outside of the second threshold distance.

Item 15 is the consignment delivery system of item 9, wherein the user authentication is a single-use security token.

Item 16 is the consignment delivery system of item 9, wherein the control circuitry is operable to request a user authentication in response to determining that the user device is within the first threshold distance of the vehicle.

Item 17 is a vehicle in operational communication with control circuitry configured to carry out the method of item 1.

What is claimed is:

1. A consignment delivery method comprising:
   determining, using control circuitry, whether a user device is within a first threshold distance of a vehicle;
   transmitting, using control circuitry, a vehicle location to the user device in response to determining that the user device is within the first threshold distance of the vehicle;
   determining, using control circuitry, whether the user device is within a second threshold distance of the vehicle, wherein the second threshold distance is less than the first threshold distance;
   requesting, using control circuitry, a user authentication from the user device in response to determining that the user device is within the second threshold distance of the vehicle; and
   providing, using control circuitry, access to a compartment of the vehicle in response to receiving the user authentication.

2. The consignment delivery method of claim 1, wherein the vehicle location is transmitted to a user by the user device when:
   the user is within a first threshold distance of the vehicle; and/or
   the user authentication is accepted.

3. The consignment delivery method of claim 1, further comprising:
   determining a user device location; and
   providing navigation instructions from the user device location to the vehicle location.

4. The consignment delivery method of claim 1 further comprising:
   providing access to the vehicle in response to receiving the user authentication; and
   subsequently providing the access to the compartment of the vehicle.

5. The consignment delivery method of claim 4, wherein the vehicle comprises a first physical barrier, and wherein the compartment comprises a second physical barrier.

6. The consignment delivery method of claim 1, further comprising:
   determining whether the user device has moved outside of the second threshold distance; and
   sending a lock command to lock the compartment of the vehicle in response to determining that the user device has moved outside of the second threshold distance.

7. The consignment delivery method of claim 1, wherein the user authentication is a single-use security token.

8. The consignment delivery method of claim 1, wherein a user authentication is requested in response to determining that the user device is within the first threshold distance of the vehicle.

9. A consignment delivery system comprising control circuitry operable to:
   determine whether a user device is within a first threshold distance of a vehicle;
   transmit a vehicle location to the user device in response to determining that the user device is within the first threshold distance of the vehicle;
   determine whether the user device is within a second threshold distance of the vehicle, wherein the second threshold distance is less than the first threshold distance;
   request a user authentication from the user device in response to determining that the user device is within the second threshold distance of the vehicle; and
   provide access to a compartment of the vehicle in response to receiving the user authentication.

10. The consignment delivery system of claim 9, wherein the vehicle location is transmitted to a user by the user device when:
   the user is within a first threshold distance of the vehicle; and/or
   the user authentication is accepted.

11. The consignment delivery system of claim 9, wherein the control circuitry is further operable to:
   determine a user device location; and
   provide navigation instructions from the user device location to the vehicle location.

12. The consignment delivery system of claim 9, wherein the control circuitry is further operable to:
   provide access to the vehicle in response to receiving the user authentication; and
   subsequently provide the access to the compartment of the vehicle.

13. The consignment delivery system of claim 12, wherein the vehicle comprises a first physical barrier, and wherein the compartment comprises a second physical barrier.

14. The consignment delivery system of claim 9, wherein the control circuitry is further operable to:
   determine whether the user device has moved outside of the second threshold distance; and
   send a lock command to lock the compartment of the vehicle in response to determining that the user device has moved outside of the second threshold distance.

15. The consignment delivery system of claim 9, wherein the user authentication is a single-use security token.

16. The consignment delivery system of claim 9, wherein the control circuitry is operable to request a user authentication in response to determining that the user device is within the first threshold distance of the vehicle.

17. A vehicle in operational communication with control circuitry configured to carry out the method of claim 1.

* * * * *